United States Patent [19]
Smith

[11] Patent Number: 5,647,991
[45] Date of Patent: Jul. 15, 1997

[54] METHOD AND APPARATUS FOR TREATMENT OF CONTAMINATED WATER USING WASTE SHOT BLAST FINES

[75] Inventor: Edward H. Smith, Dallas, Tex.

[73] Assignee: Tyler Pipe Company, Birmingham, Ala.

[21] Appl. No.: 320,866

[22] Filed: Oct. 11, 1994

[51] Int. Cl.$^6$ ............................................. C02F 1/42
[52] U.S. Cl. ........................... 210/662; 210/663; 210/670; 210/688
[58] Field of Search ................................ 210/688, 690, 210/691, 692, 693, 679, 662, 663, 670, 671, 675, 673, 680

[56] References Cited

U.S. PATENT DOCUMENTS

| | | | |
|---|---|---|---|
| 3,499,837 | 3/1970 | Jaunarajs | 210/679 |
| 3,986,953 | 10/1976 | Beaucaire | 210/667 |
| 4,343,706 | 8/1982 | Etzel et al. | 210/667 |
| 4,377,483 | 3/1983 | Yamashita et al. | 210/688 |
| 4,565,633 | 1/1986 | Mayenkaer | 210/688 |
| 5,124,044 | 6/1992 | Cassidy et al. | 210/683 |
| 5,133,873 | 7/1992 | Catlin et al. | 210/715 |
| 5,244,503 | 9/1993 | Fabian | 134/6 |
| 5,266,213 | 11/1993 | Gillham | 210/909 |
| 5,362,394 | 11/1994 | Blowes et al. | 210/617 |
| 5,362,404 | 11/1994 | Haitko | 210/757 |

OTHER PUBLICATIONS

Metals Treatment at Superfund Sites by Adsorptive Filtration, U.S. EPA, Sep. 1993.
Sorption Onto And Recovery of CR(VI) Using Iron Oxide Coated Sand, Bailey et al, Water Sci. Tech. vol. 26, No. 5–6, pp. 1239–1244 (1992).
Electrochemical Iron Generation: The Ideal Process for Simultaneous Removal of Heavy Metals from Contaminated Groundwater, Michael Brewster, Jack Reich and Tom Crossman, Sep. 1993 Abstract.
Electrochemical Recovery of Metals and Complexing Agents from Washing of Metal Contaminated Soils, Daniel J. Dougherty and Herbert E. Allen, Sep. 1994, Abstract.
A New Hybrid Inorganic Sorbent for Heavy Metals Removal in Fixed Beds, Yi–Min Gao and Arup K. Sengupta, Sep. 1994 Abstract.
Automobile Shredder Residue: A Potential Material for Decontamination of Lead, Farouk T. Awadalla and Michael Day, Sep. 1993 Abstract.
Cadmium Adsorption on Iron Oxides in the Presence of Alkaline–Earth, Christina E. Cowan, John M. Zachara and Charles R. Resch, Nov. 1991.
Chromate Adsorption on Amorphous Iron Oxyhydroxide in the Presence of Major Groundwater Ions, John M. Zachara, Donald C. Girvin, Ronald S. Schmidt and C. Thomas Resch, Nov. 1987.
Adsorption and Desorption of Metal on Ferrihydrite: Reversibility of the Reaction and Corption Properties of the Regenerated Solid, Matthew F. Schultz, Mark M. Benjamin and John F. Ferguson, Nov. 1987.
Adsorption and Surface precipitation of Metals on Amorphous Iron Oxyhydroxides, Mark M. Benjamin, Nov. 1983.
Regeneration and Reuse of Iron Hydroxide Adsorbents in Treatment of Metal–Bearing Wastes, Marc Edwards and Mark M. Benjamin, Apr. 1989.

(List continued on next page.)

Primary Examiner—Cynthia L. Nessler
Attorney, Agent, or Firm—Michael A. O'Neil

[57] ABSTRACT

A method and apparatus for removing contaminants such as heavy metals and organic pollutants from contaminated water using waste cast steel shot blast fines is described. Shot blast fines were hitherto disposed of by the iron processors at significant cost. In another embodiment, waste shot blast fines are used to fix heavy metal and organic contaminants in groundwater and water runoff from contaminated landfills and industrial sites.

18 Claims, 6 Drawing Sheets

OTHER PUBLICATIONS

Adsorptive Filtration Using Coated Sand: A New Approach for Treatment of Metal–Bearing Wastes, Marc Edwards and Mark M. Benjamin, Sep. 1989.

Evaluating a New Granular iron oxide for Remiving Lead from Drinking Water, Thomas L. Theis, Ramesh Iyer and Sonia K. Ellis, Jul. 1992.

Effects of Conditioning and Treatment of Chabazite and Clinoptilolite Prior to Lead and Cadmium Removal, Sabeha Kesraoul–Oukl, Christopher Cheeseman and Roger Perry, Nov. 1993.

Removal of Copper (II) Using Vermiculite, Narayan C. Das and Manas Bandyopadhyay, Nov. 1992–Dec. 1992.

Removal of Soluable Manganese by Oxide–Coated Filer Media: Sorption Rate and Removal Mechanism Issues, William R. Knocke, Suzanne C. Occiano and Robert Hungate, Aug. 1991.

An Analysis of Concentration and Temperature Effects in Cementation Reactions, Jan D. Miller, Ph.D., Jul. 1973.

Surface Deposit Effects in Kinetics of Copper Cementation by Iron, J.D. Miller and L.W. Beckstead, Aug. 1973.

Sorption of Volatile Organic Solvents from Aqueous Solution onto Subsurface Solids, Marvin D. Piwoni and Pinaki Banerjee, May 1988.

Bonding of Chlorophenols on Iron and Alumium Oxides, King–Hsi S. Kung and Murray B. McBride, Nov. 1991.

Ground Water Currents—Developments in innovatice ground water treatments, U.S. Environmental Protection Agency, Mar. 1993, pp. 1–5 and p. 8.

The Superfund Innovatice Technology Evaluation Program: Technology Profiles, U.S. Environmental Protection Agency, Nov. 1989, pp. 113–114.

5,647,991

METHOD AND APPARATUS FOR TREATMENT OF CONTAMINATED WATER USING WASTE SHOT BLAST FINES

TECHNICAL FIELD

The present invention relates to a method and apparatus for treating contaminated water, and more particularly to the removal of heavy metal and organic pollutants from contaminated water using waste shot blast fines.

BACKGROUND OF THE INVENTION

Beginning in 1972, the Congress of the United States instituted a comprehensive regulatory scheme for tracking and reducing water pollution. These provisions, known generally as the Clean Water Act, have become progressively more restrictive in the type and amount of pollutants facilities are permitted to discharge. The facility (point source) is controlled by regulations citing technology-based effluent limitations. For toxic and non-conventional pollutants the facility must use the best available technology economically achievable and the effluent limitations are reviewed every five years.

One area of particular concern for both industry and for government regulators is the release of heavy metals into the environment. Heavy metals such as cadmium, lead and zinc have been found to be toxic in minute quantities. The Environmental Protection Agency suggests that it takes an unstressed ecological system approximately three years to recover from a pollution event in which excessive amounts of cadmium are released.

Lead has been pin-pointed as an especially dangerous heavy metal. It tends to concentrate in the skeletal system of humans and animals, amplifying its toxicity as the individual is exposed over time. Elevated levels of lead in blood samples taken from children in urban areas are particularly alarming. Lead has been linked to cancer development, brain damage and birth defects.

Organic chemicals of various sorts such as carbon tetrachloride, chloroform, trichloroethane, tetrachloroethane, perchloroethylene, trichloroethylene, phenol, benzene, dichlorobenzene and many others are commonly used in manufacturing processes and are frequently found in wastewater streams. As in the case of heavy metals, the discharge regulations have grown progressively more stringent, allowing smaller amounts of these pollutants to be discharged into the environment. American industry has been forced to treat effluent containing these compounds to remove all but trace amounts, often at considerable expense.

The electronic and defense industries frequently generate waste streams containing both organic chemicals and heavy metals. Metal finishing, stripping and painting operations produce wastewaters contaminated with phenol, tetrachloroethylene, trichloroethylene, ethylene chloride, isopropyl alcohol, and ketones in conjunction with one or more heavy metals such as lead, cadmium and others. The aqueous-phase concentrations of organics may range from ten to several hundred ppm as in the case of phenol and from one to five hundred ppm lead.

There have been substantial efforts directed to finding cost effective methods to remove these heavy metals and organic materials from wastewaters. Many of the methods currently in use or under study involve the adsorption or absorption of the organics onto a treatment matrix. Activated carbon is commonly used in wastewater treatment facilities to remove organic contaminants from wastewater streams. Peroxide oxidation is also a common treatment technique for removal of organic contaminants.

Wastewater contaminated by heavy metals is typically treated by reducing processes, coagulation, precipitation or a combination of these techniques. These procedures are both time-consuming and expensive. While adsorption onto activated carbon is commonly used to treat wastewater to remove organics, the use of adsorbents for treating the heavy metals in wastewater is still in the experimental stage. Numerous investigators have demonstrated that activated carbon can be used to remove heavy metals, at least at the laboratory scale. Activated carbon is, however, expensive.

Heavy metals and hazardous organic materials are also sometimes found in the runoff and groundwater associated with contaminated industrial sites and landfills. Many such sites are abandoned, leaving contaminants which may migrate with natural water flows from the site. Such contaminated water flows could pose a danger to human health and the environment, forcing industry and government to intervene to protect the public interest. A similar situation exists in disposal sites where contaminants were inadequately contained.

There is a need for an economical method of intercepting contaminated water flows and fixing the contaminants in situ. There exists, additionally, a need in industry for an easily applied, cost-effective sorbent to remove heavy metal and organic contaminants from contaminated water streams.

SUMMARY OF THE INVENTION

The invention provides a method and an apparatus for removing heavy metal and organic contaminants from contaminated water using waste shot blast fines, a material that has been heretofore discarded in landfills at substantial expense to the cast iron manufacturing industry. The water treatment process can be performed in a continuous fixed bed procedure, eliminating the sedimentation or filtration steps necessary when powdered purification agents are utilized.

The invention also provides a powdered iron-containing material suitable for treating contaminated water in a batch mode. Sieving the shot blast fines yields a fraction that will pass through a 200 mesh screen, ideal for a process containing a sedimentation or filtration steps.

Additionally, the invention provides a method of treating groundwater and runoff streams from sites that have been contaminated with heavy metals or organic materials. This technique can be implemented by placing a barrier of waste shot blast fines in situ, so as to intercept the contaminated stream of water.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION OF THE INVENTION

Figure 1:
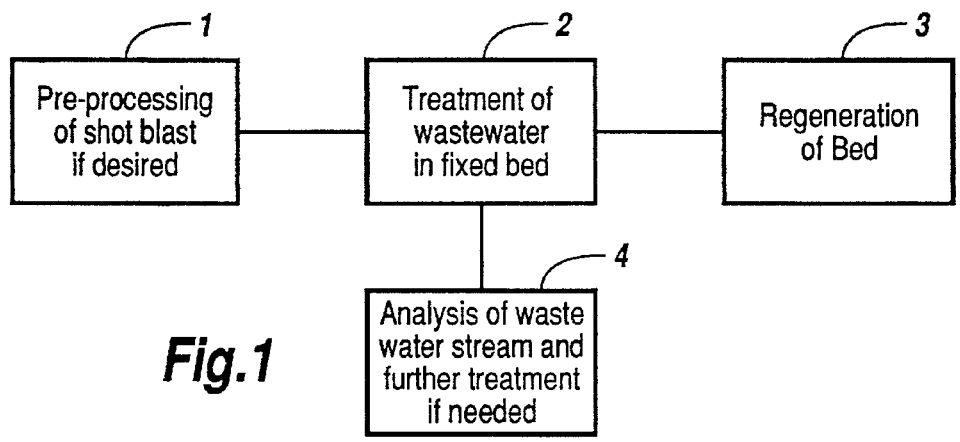
FIG. 1 is a flow diagram showing the use of shot blast fines for the treatment of wastewater according to the present invention.

Waste cast steel shot blast fines, a product of surface finishing operations in the manufacture of ductile and/or gray iron castings, is an iron-containing waste product that is currently discarded as a solid waste in landfills. Shot blast fines are produced when the surfaces of iron fittings, flanges, mechanical joints and the like are finished out. Steel shot is mechanically propelled against the iron to be cleaned to remove sand, rust or other materials from the surface of the iron. Impingement of the steel shot against the surface generates fines containing iron, in addition to residual substances from the casting. The used shot material is then screened and separated. Fines generated during the cleaning process are separated from the degraded shot and the intact steel shot recycled. The fines that are separated out are the subject of the present invention. Some iron processors generate several cubic yards of shot-blast fines daily, representing a substantial disposal expense. Cast steel shot blast fines are principally iron, with trace amounts of antimony, chromium, copper, magnesium, manganese, molybdenum, nickel, sodium, tin, and zinc.

A typical analysis of a sample of cast steel shot blast fines is seen in Table 1.

TABLE 1

Elemental Analysis of Typical Waste Cast Steel Shot Blast Fines

| Element | mg per kg |
|---|---|
| Antimony | 160 |
| Cadmium | 5 |
| Chromium | 907 |
| Copper | 1,011 |
| Iron | 839,200 |
| Lead | 96 |
| Magnesium | 177 |
| Manganese | 5,889 |
| Molybdenum | 244 |
| Nickel | 714 |
| Sodium | 132 |
| Thallium | 26 |
| Tin | 49 |
| Zinc | 636 |

The trace materials seen in the chemical analysis above do not leach from the shot blast fines. The shot blast fines have been tested using a Toxicity Characteristic Leaching Procedure (TCLP), EPA Test Method 1311 as incorporated in 40 CFR 261, March 1994 (Test Methods, 1994). Typical results of a TCLP analysis are shown below:

TABLE 2

Representative Toxicity Characteristic Leaching Procedure Test Results

| Element | mg per kg |
|---|---|
| Arsenic | <.02 |
| Barium | <.4 |
| Cadmium | <.006 |
| Chromium | <.12 |
| Lead | <.04 |
| Selenium | <.20 |
| Silver | <.02 |

The mechanism for the removal by shot blast fines of heavy metals from wastewater streams appears to be multifaceted. Surface complexation is one of the primary proposed mechanisms for heavy metal removal. An iron-containing material such as shot blast may have oxide or hydroxylated metal surface sites in solution such as >Fe-$OH_2^+$, >Fe-OH, and >Fe-$O^-$ representing positively charged, neutral and negatively charged sites, respectively. The symbol > denotes that the Fe atom is part of the solid matrix. Other possible mechanisms that may be active for metal removal in this context are coprecipitation at elevated pH, ion exchange with cationic sites, physical adsorption, and cementation of metal cations by a more electropositive (e.g., Fe) metal.

The cast steel shot blast fines are ideal for use in wastewater treatment since a substantial portion of the material is granular, and therefore may be used in a flow-through fixed bed treatment scheme. The waste cast steel shot blast fines contain particles of different sizes, and pre-processing to separate smaller size fractions may be desirable for some applications. The smaller size fractions may be used for batch mode applications in treatment processes that include sedimentation or filtration steps. A representative sieve analysis of cast steel shot blast fines generated during finishing operations in which iron parts were blasted with steel shot is shown in Table 3, below.

TABLE 3

Size Inventory of a Sample of Shot-Blast Fines

| Size Fraction | % by Vol. | Cum. % by Vol. |
|---|---|---|
| Pass 200 | 0.9 | 0.9 |
| 100/200 | 16.9 | 17.8 |
| 80/100 | 13.2 | 31.0 |
| 60/80 | 30.1 | 61.1 |
| 50/60 | 15.0 | 76.1 |
| 40/50 | 15.0 | 91.1 |
| 30/40 | 5.6 | 96.7 |
| 20/30 | 2.4 | 99.1 |
| 10/20 | 0.9 | 100.0 |

As shown in Table 3 approximately two thirds of the sample run of cast steel shot blast fines is greater than 80 mesh and thus more adapted to fixed bed wastewater treatment applications than the smaller size fractions. Because of its greater size and weight, the larger mesh shot blast fines are not likely to be incorporated into the contaminated water stream and no filtration or sedimentation step is needed in the water treatment process. The remaining smaller mesh size fraction of cast steel shot blast fines, i.e. <80 mesh may be used for batch water treatment processes requiring sedimentation or filtration. The shot blast fines can also be used as an effective pretreatment prior to or in combination with other water treatment processes such as oxidation, precipitation or adsorption onto activated carbon if necessary.

Cast steel shot blast fines may be used in packed beds similar to those now used for activated carbon or ion exchange resins, both relatively expensive commercial sorbents. In a typical wastewater purification process using packed beds, wastewater flows through a fixed bed of adsorbent. The grain size and density of the sorbent prevents the movement of the sorbent particles into the wastewater stream, thus avoiding the filtration or sedimentation steps discussed above.

Laboratory-scale batch-mode and fixed-bed dynamic adsorption tests have both demonstrated that the removal capacity of shot blast fines compares favorably with that of activated carbon for the removal of some heavy metals. Bottle-point isotherm tests have been used to ascertain the adsorption capacity of target heavy metals by shot blast fines. Example 1 illustrates a batch isotherm test in which the adsorptive capacities of both powdered and granular cast iron shot blast fines are compared with that of activated carbon.

EXAMPLE 1

The prepared shot-blast fines are contacted with aqueous solution containing the solutes of interest at pre-established conditions of pH, background components and initial solute concentration in well-sealed, 125 ml teflon or glass bottles which, when agitated, can be assumed to function as completely-mixed batch reactors. Following the contact period, the equilibrium pH is measured and a sample taken from each reactor and filtered to separate the solid. Filtered aqueous sample can be directly analyzed for solution components. Several reactors containing no sorbent are used to establish the initial concentration of adsorbates. Upon measurement of the equilibrium solute concentrations, corresponding solid-phase concentrations can be computed from a material balance. According to this technique, each vessel containing shot-blast fines and solute produces a data point which, taken together, define the overall equilibrium relationship for the stated conditions.

Figure 4:
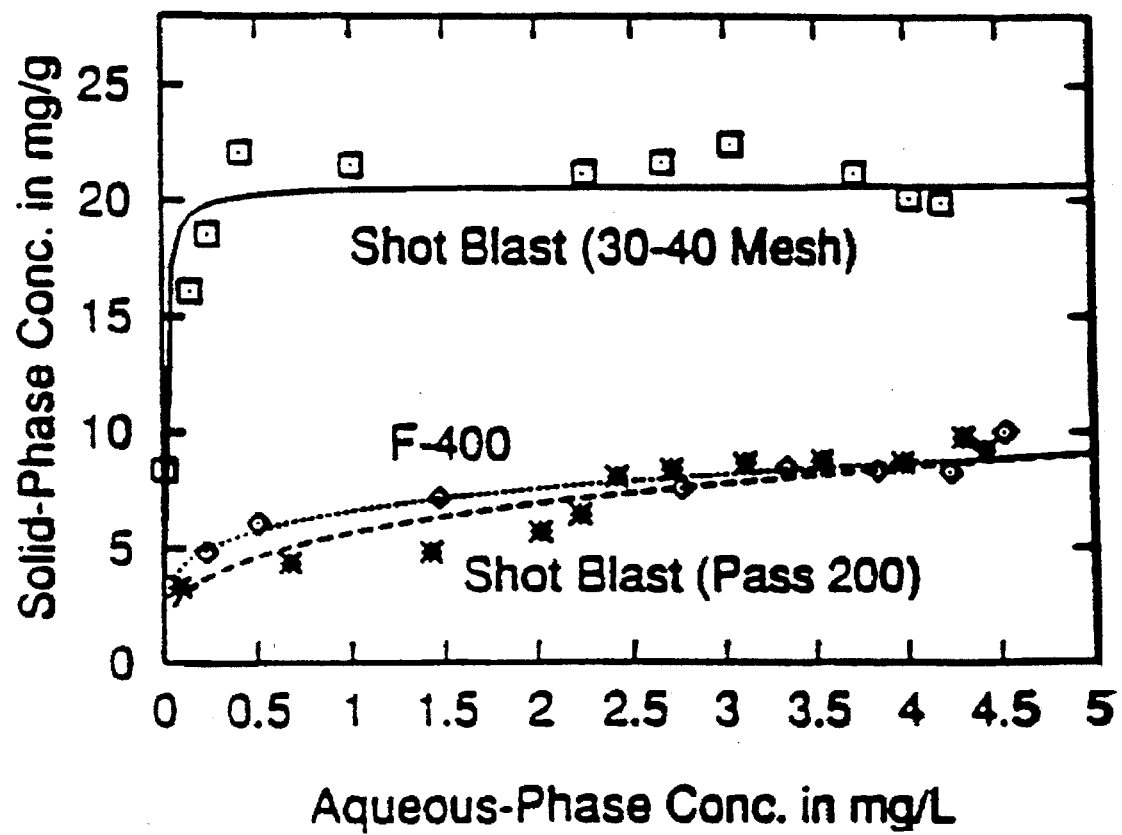
FIG. 4 is a graph showing the adsorptive capacity of shot blast fines for the cadmium ion in wastewater streams.

FIG. 4 shows the adsorptive capacity of cast steel shot blast fines for the cadmium ion in wastewater streams.

Figure 5:
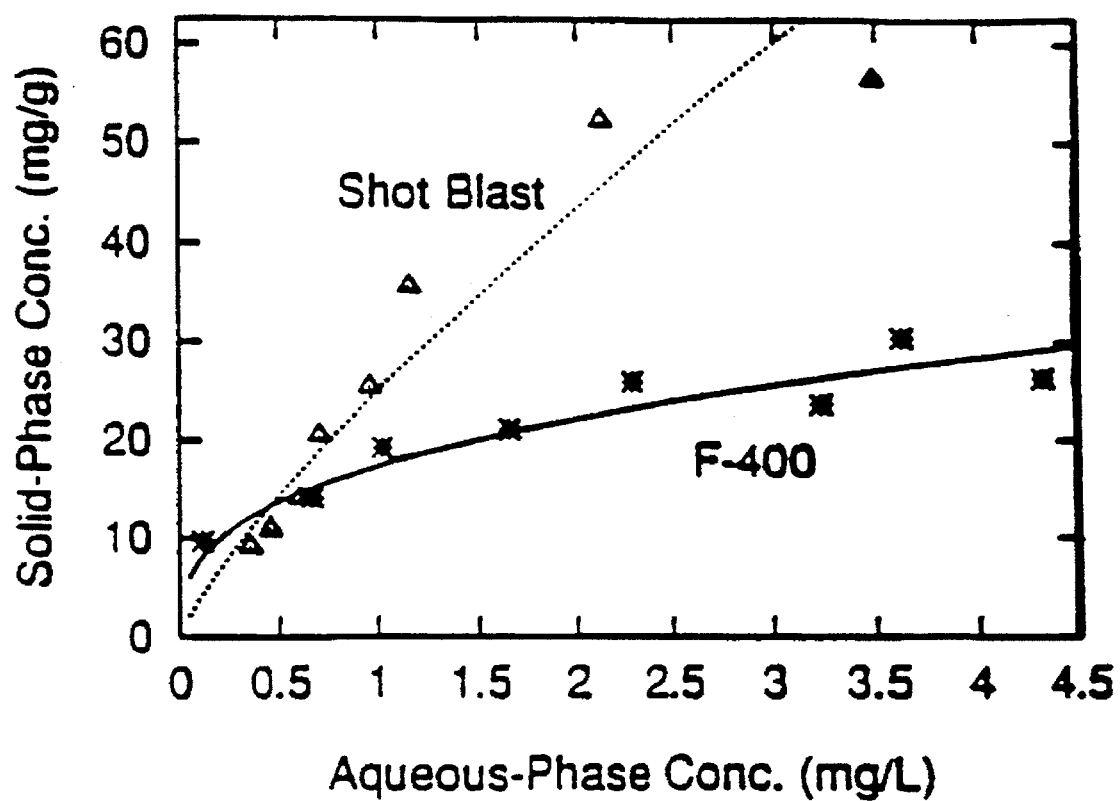
FIG. 5 is a graph showing the adsorptive capacity of shot blast fines for lead contaminants in wastewater streams.

FIG. 5 illustrates a similar test of the adsorptive capacity of cast steel shot blast fines for lead contaminants in wastewater.

Figure 6:
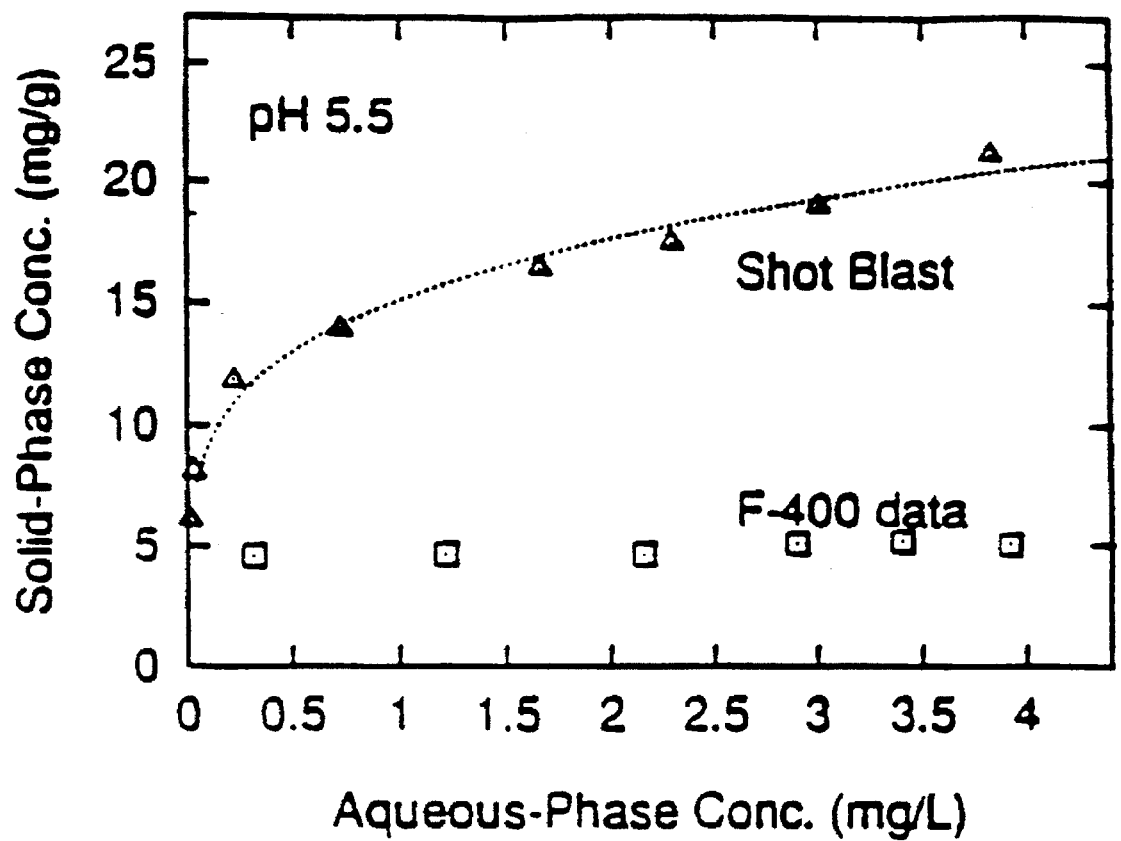
FIG. 6 is a graph showing the adsorptive capacity of shot blast fines for zinc contaminants in wastewater streams.

FIG. 6 illustrates a similar test of the adsorptive capacity of cast steel shot blast for zinc contaminants in wastewater.

In each of the foregoing tests the adsorptive capacity of the cast steel shot blast fines exceeded that of F-400 activated carbon, an expensive commercial sorbent in current use in wastewater treatment processes. After initial screening with batch-mode testing, the shot-blast fines were tested using dynamic column studies. These laboratory-scale, fixed-bed adsorber studies evaluated the use of shot-blast material in the fixed-bed mode. The procedure for dynamic column studies is seen in Example 2.

EXAMPLE 2

A stainless steel column with inside diameter of 0.55–2.0 cm., depending upon the average particle diameter of the cast steel shot blast fines, is packed with a given mesh size fraction of shot blast fines at approximately 1–3 cm depth. The sorbent column is supported on a fine mesh stainless steel screen and on a layer of teflon flakes. Feed solution containing the contaminant is continuously mixed in a storage reservoir and pumped in upflow mode through the column at 0.12–0.70 cm/s superficial velocity, corresponding to a volumetric throughput of approximately 0.1 to 9 $cm^2$/sec using a high-precision, high pressure solvent delivery pump. Both influent and effluent samples are collected at frequent intervals to obtain the relative concentration breakthrough profiles. The run proceeds until the column is exhausted as given by the effluent concentration of the contaminant leveling off at its influent value. Effluent pH is also monitored. Similar dynamic fixed-bed experiment were also run using deeper beds (6–9 cm.).

Figure 7:
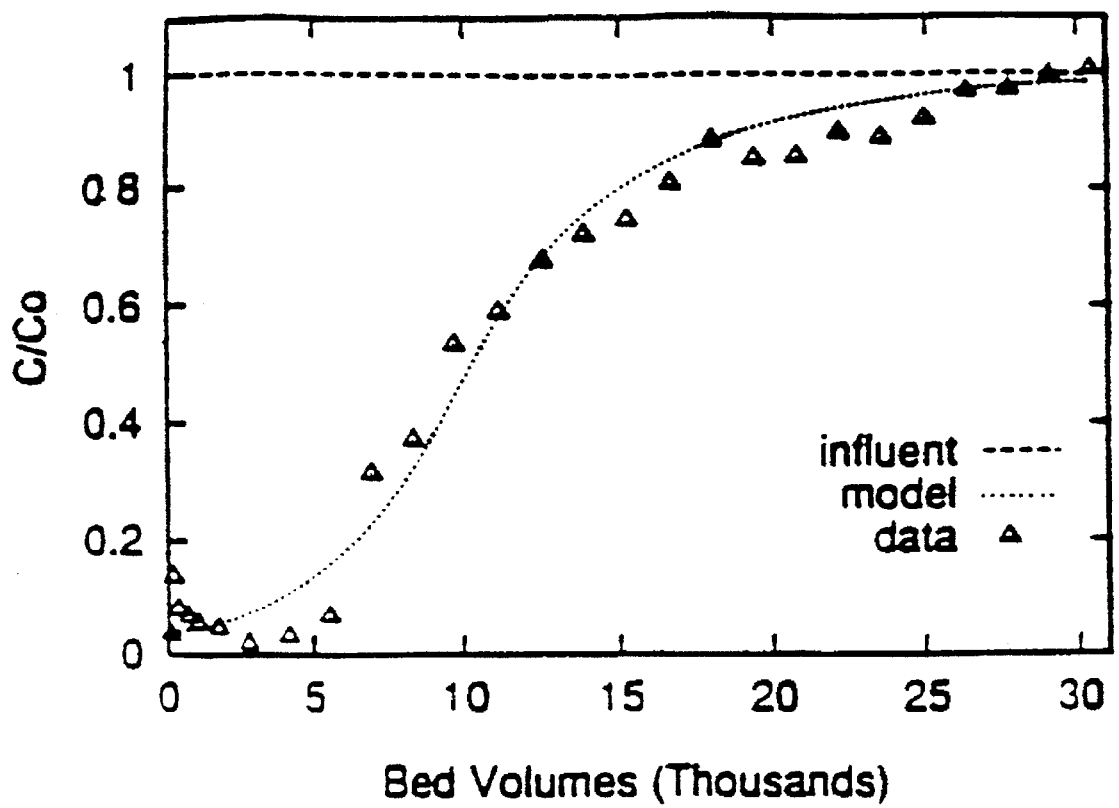
FIGS. 7 and 8 are graphs showing the results of dynamic fixed bed flow tests used for determining the adsorptive capacity of shot blast fines for cadmium.
Figure 8:
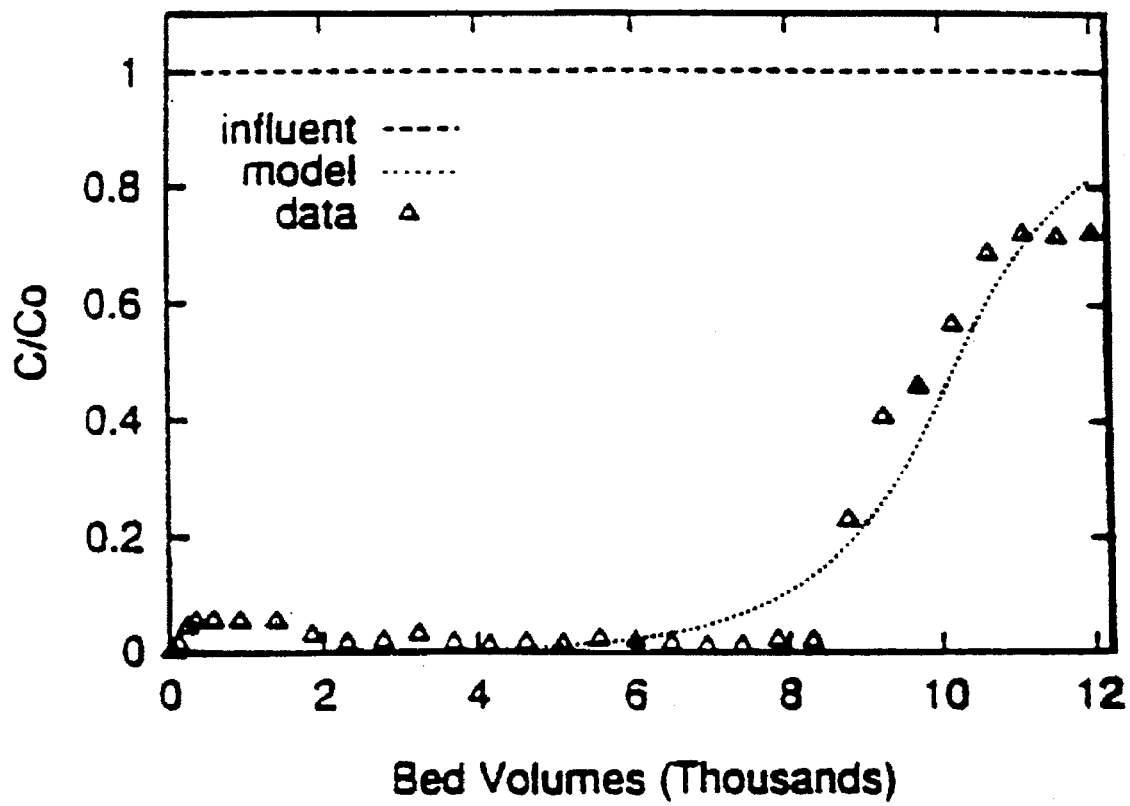

Results of dynamic fixed bed flow tests using a short bed (3 cm) and a long bed (9 cm) for cadmium are shown in FIGS. 7 and 8.

A homogeneous surface diffusion model was highly successful in predicting the fixed-bed performance of the shot blast fines, making scale-up much easier. A high level of removal of heavy metal ions was found when up to 15,000 bed volumes of heavy metal-containing wastewater was passed through bench-scale fixed bed absorbers. Perchloroethylene, a chlorinated solvent commonly present in many contaminated groundwaters and industrial wastewaters, and phenol, an aromatic, were found to be adsorbed onto shot blast fines. Cast steel shot blast has additionally been found to remove organic contaminants in wastewater.

As illustrated in FIG. 1, the waste shot blast fines may be pre-processed, block 1. The preparation of the shot blast, if desired, consists of sieving the material obtained from the shot blast unit to separate the various size fractions. The shot blast particles typically range from 20/30 mesh to greater than 200 mesh. Experimental data show a marked increase in adsorption capacity as the particle size increases. This effect is seen in Table 3.

The shot blast is then placed in a fixed bed treatment vessel and wastewater circulated over the bed as seen in block 2. It may be desirable to adjust the pH of the wastewater prior to treatment. Generally, the wastewater pH should be in the range of 4–9 for treatment with cast steel shot blast-containing beds. Periodic analysis of the effluent may be performed to determine if further treatment is needed, as shown in block 4. The wastewater treatment process can be optimized for some metals, however, by adjusting the pH up or down depending upon the adsorption characteristics of the metal. Cadmium, for example, adsorbs onto the shot blast fines more effectively at pH 7 than at pH 4. Zinc adsorption, however, peaks at pH 6.0–6.5. Background ionic concentration may also affect the absorption characteristics of the shot blast fines bed.

Regeneration of the shot blast fixed bed, block 3, is periodically required to remove accumulated heavy metals compounds adsorbed upon the iron adsorption sites. Regeneration may be accomplished by stripping the shot blast bed with an acidic solution or a concentrated ionic solution such as 1–2 molar sodium chloride. The shot blast fines bed can then be returned to service.

The output of wastewater treatment with a bed of shot blast fines may be monitored to ensure the desired level of contaminant reduction is achieved. Instrumentation such as a gas chromatograph with flame ionization and electron capture detectors may be used to monitor the concentration of organic contaminants in the treated wastewater. Heavy metal concentration in the treated wastewater may be monitored with an inductively coupled plasma spectrometer.

Figure 2:
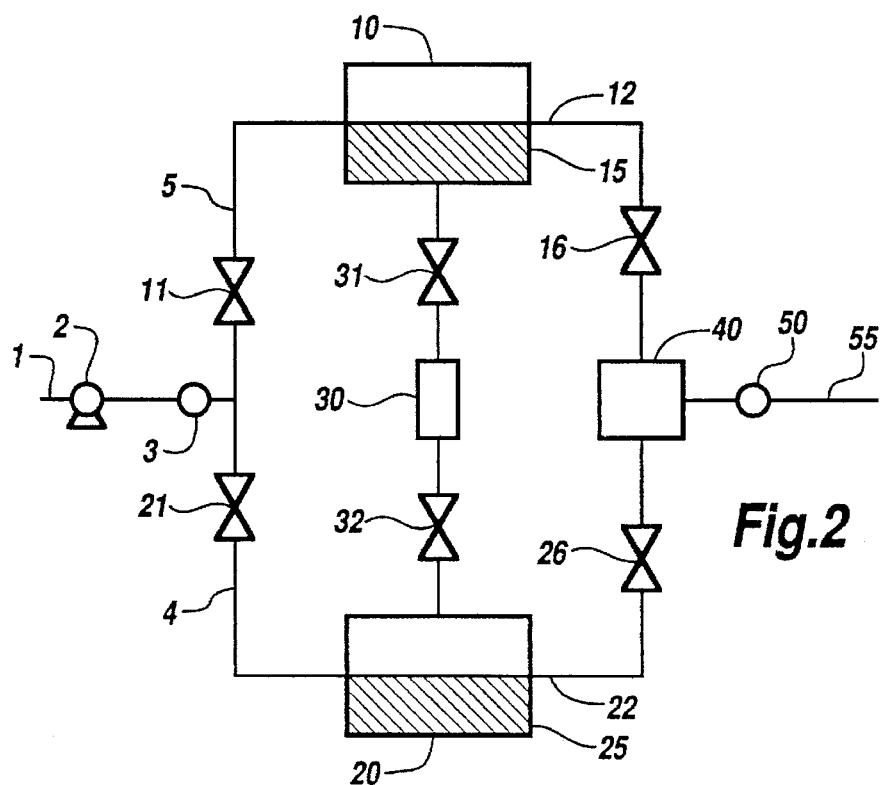
FIG. 2 is a schematic drawing showing an apparatus for treating wastewater using fixed beds of waste shot blast fines to remove heavy metals and/or organic contaminants.

An apparatus using cast steel shot blast fines to purify wastewater is illustrated in FIG. 2. Wastewater is transported through line 1 to a treatment facility. The wastewater is directed by a pump 2 through flowmeter 3, then through line 5 to either treatment vessel 10 or alternately through line 4 to treatment vessel 20. Treatment vessels 10 and 20 each contain beds of cast steel shot blast fines 15 and 25. The thickness of the bed can be varied with the flow rate through the bed and the concentration and type of contaminant to be removed. The flow path of the wastewater is selected by opening or closing valves 11, 16, 21 and 26. Treated wastewater from either treatment vessel 10 or treatment vessel 20 is then directed through lines 12 or 22 to be further treated or "polished" in secondary treating vessel 40, if desired.

Regeneration means 30 is connected to both treatment vessel 10 and treatment vessel 20 respectively to allow one bed to undergo regeneration while the other bed is on stream so that the wastewater treatment process need not be interrupted for regeneration. Acidic fluids and concentrated ionic solutions, for example 1-2 molar sodium chloride, have been found to regenerate the shot blast fines in beds 10 and 25. Flow of the regeneration fluid to the treatment vessels 10 and 20 is controlled by valves 31 and 32.

The wastewater quality can be monitored at sampling point 50 to ensure that the desired effluent quality is maintained. Monitoring can be accomplished by instrumentation suitable for the contaminant. For example, gas or liquid chromatographs can be used for organic contaminants. An atomic absorption spectrometer or an inductively coupled plasma spectrometer can be used for heavy metals. Finally the treated effluent exits the system through line 55.

Additionally, mathematical models have been developed that simulate adsorption phenomena under both static and dynamic flow conditions. The models can be used to predict the point at which the contaminant will be found in the effluent exiting the fixed bed or the "breakthrough" point. The mathematical models can be used to scale-up the wastewater treatment process to commercial scale.

Figure 3:
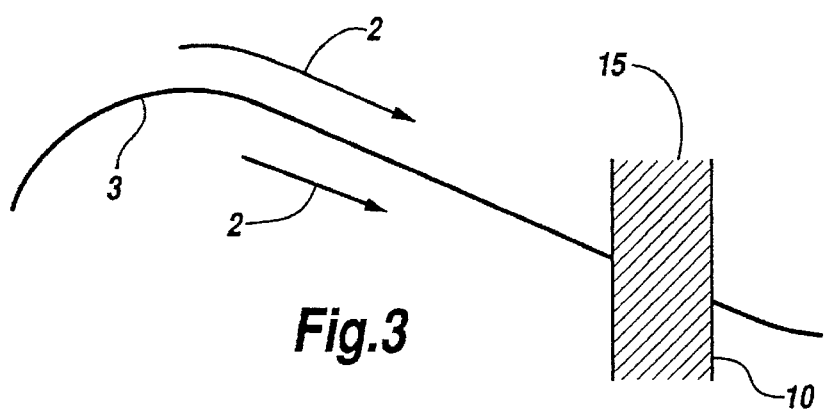
FIG. 3 illustrates a bed of shot blast fines intercepting contaminated water flowing from a site contaminated with organic chemicals or heavy metals.

In another embodiment of the present invention, a bed of waste cast steel shot blast fines may be used to intercept water flow from a contaminated industrial site or landfill so as to prevent the migration of heavy metals or organic substances beyond the barrier. Referring to FIG. 3, rainwater runoff and natural water flow courses 2 tend to leach pollutants such as heavy metals or other contaminants from the contaminated soil 3. After determining the run-off and sub-surface water flow patterns and the soil characteristics by conventional means, a trench 10 can be dug so as to intercept the water flow. This trench can be filled with waste cast steel shot blast fines 15. This in situ bed will intercept and fix the heavy metals and/or organics, preventing further migration.

Alternately, the waste shot blast fines may be mixed with other adsorbent material to facilitate the clean-up of chemical spills.

While particular embodiments of the present invention have been illustrated and described, it will be apparent to those skilled in the art that various changes and modifications may be made without departing from the spirit and scope of the invention.

I claim:

1. A method for treating water contaminated with heavy metals selected from the group consisting of cadmium, zinc, copper, mercury, chromium, and lead, comprising the steps of:

collecting shot blast fines generated during the processing of iron containing materials;

pre-processing the fines to obtain a sorbent suitable for use in treating a contaminated water source; and contacting contaminated water with the sorbent to remove the contaminants.

2. The method of claim 1 wherein the fines are generated during impingement cleaning of iron-containing articles.

3. The method of claim 1 wherein the pre-processing comprises sieving the fines.

4. The method of claim 1 wherein the contacting step comprises flowing the contaminated water through a bed of fines.

5. The method of claim 4 wherein the fines have a particle size greater than 80 mesh.

6. The method of claim 1 further comprising adjusting the pH of the contaminated water to a value between pH 4 and pH 7.

7. The method of claim 1 further comprising the step of regenerating the bed of fines.

8. The method of claim 7 wherein the regeneration step is performed by contacting the fines with an acid.

9. The method of claim 7 wherein the regeneration step is performed by contacting the fines with a concentrated ionic solution.

10. The method of claim 1 further comprising monitoring the contaminant content of the water after it is directed through the fixed bed.

11. A method for treating water contaminated with heavy metals selected from the group consisting of cadmium, zinc, copper, mercury, chromium, and lead, comprising the steps of:

collecting shot blast fines generated during the processing of iron-containing materials;

pre-processing the fines to isolate a fraction suitable to be retained in a fixed bed when water is flowed through the bed;

forming a bed of the fines suitable to be retained;

directing the contaminated water through the bed of fines; and regenerating the bed to remove the contaminants adsorbed onto the fines.

12. The method of claim 11 wherein the pre-processing step comprises sieving the fines.

13. The method of claim 11 wherein the fines suitable to be retained have a mesh size greater than 80 mesh.

14. The method of claim 11 wherein the regeneration step comprises contacting the bed with an acid.

15. The method of claim 11 wherein the regeneration step comprises contacting the bed with a concentrated ionic solution.

16. A method for treating water contaminated with heavy metals selected from the group consisting of cadmium, zinc, copper, mercury, chromium, and lead, comprising the steps of:

collecting shot blast fines generated during the processing of iron-containing materials;

sieving the fines to separate a first fraction having a particle size greater than 80 mesh and a second fraction having a particle size less than 80 mesh;

forming a bed of the first fraction of fines in a wastewater treatment vessel;

directing the contaminated water through the bed of fines to remove the contaminants;

monitoring the contaminant content of the water after it is directed over the bed; and regenerating the bed of fines by contacting the bed with an acid.

17. The method of claim 16 further comprising the step of using the second fraction to purify contaminated water.

18. The method of claim 16 further comprising the step of adjusting the pH of the contaminated water to a value between pH 4 and pH 9.

* * * * *

UNITED STATES PATENT AND TRADEMARK OFFICE
CERTIFICATE OF CORRECTION

PATENT NO. : 5,647,991
DATED : July 15, 1997
INVENTOR(S) : Edward H. Smith

It is certified that error appears in the above-indentified patent and that said Letters Patent is hereby corrected as shown below:

Column 5, Line 58
    Replace: [0.55]
    With: --0.5--

Column 6, Line 1
    Replace: [cm$^2$]
    With: --cm$^3$--

Signed and Sealed this

Third Day of February, 1998

Attest:

BRUCE LEHMAN

*Attesting Officer*      *Commissioner of Patents and Trademarks*